United States Patent
Fliszar et al.

(10) Patent No.: US 11,927,794 B2
(45) Date of Patent: *Mar. 12, 2024

(54) WAVEGUIDE WITH 2-LAYER STACK-UP

(71) Applicant: Snap Inc., Santa Monica, CA (US)

(72) Inventors: David Fliszar, Manhattan Beach, CA (US); Amit Singh, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,584

(22) Filed: Feb. 9, 2023

(65) Prior Publication Data

US 2023/0185016 A1    Jun. 15, 2023

Related U.S. Application Data

(63) Continuation of application No. 17/411,269, filed on Aug. 25, 2021, now Pat. No. 11,598,914.

(60) Provisional application No. 63/076,583, filed on Sep. 10, 2020.

(51) Int. Cl.
*F21V 8/00* (2006.01)
*G02B 6/02* (2006.01)

(52) U.S. Cl.
CPC ....... *G02B 6/0076* (2013.01); *G02B 6/02395* (2013.01); *G02B 6/02209* (2013.01)

(58) Field of Classification Search
None
See application file for complete search history.

(56) References Cited

U.S. PATENT DOCUMENTS

| | | | |
|---|---|---|---|
| 11,598,914 B2* | 3/2023 | Fliszar | G02B 5/1809 |
| 2018/0059320 A1 | 3/2018 | Miller et al. | |
| 2019/0011708 A1 | 1/2019 | Schultz et al. | |
| 2020/0116996 A1 | 4/2020 | Lee et al. | |

FOREIGN PATENT DOCUMENTS

| | | |
|---|---|---|
| CN | 104406357 A | 3/2015 |
| WO | 2019059916 A1 | 3/2019 |
| WO | 2019074679 A1 | 4/2019 |

OTHER PUBLICATIONS

International Search Report and Written Opinion for International Application No. PCT/US2021/047459, dated Dec. 13, 2021 (Dec. 13, 2021)—10 pages.

* cited by examiner

*Primary Examiner* — Jerry Rahll
(74) *Attorney, Agent, or Firm* — Culhane Meadows PLLC; Stephen J. Weed

(57) ABSTRACT

A lightweight stacked optical waveguide using two plastic substrates having nano-structure gratings and a single glass substrate sandwiched between them. The nano-structure gratings face each other, and are each encapsulated within the optical waveguide. The two plastic substrates are each adhesively secured to the central glass substrate rather than to each other to provide sufficient securing strength and precisely establish and maintain an air gap between the substrates. The thickness of the plastic substrates and the glass substrate are selected such that the stacked optical waveguide is lightweight, but also has sufficient drop performance. The stacked optical waveguide can be efficiently manufactured as the adhesive bonds a plastic substrate to a glass substrate.

20 Claims, 1 Drawing Sheet

WAVEGUIDE WITH 2-LAYER STACK-UP

CROSS-REFERENCE TO RELATED APPLICATIONS

This application is a Continuation of U.S. application Ser. No. 17/411,269 filed on Aug. 25, 2021, and claims priority to U.S. Provisional Application Ser. No. 63/076,583 filed on Sep. 10, 2020, the contents of which are incorporated fully herein by reference.

TECHNICAL FIELD

The present subject matter relates to optical waveguides used in a display, such as for an eyewear device including smart glasses and headwear.

BACKGROUND

Optical waveguides may be formed using techniques which may create defects.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
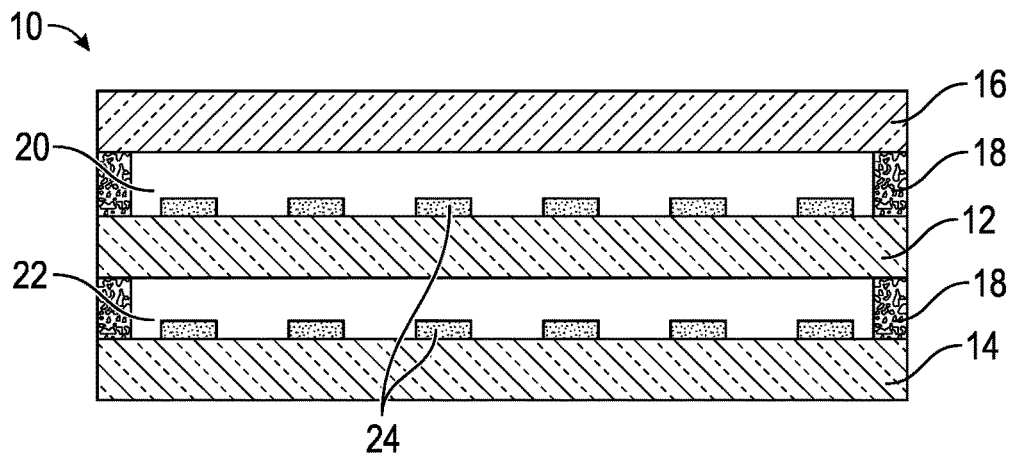
FIG. 1 illustrates a stacked optical waveguide having two glass substrates secured to each other.

This disclosure includes examples of a lightweight stacked optical waveguide using two plastic substrates having nano-structure gratings and a single glass substrate sandwiched between them. The nano-structure gratings face each other, and are each encapsulated within the optical waveguide. The two plastic substrates are each adhesively secured to the central glass substrate rather than to each other to provide sufficient securing strength and precisely establish and maintain an air gap between the substrates. The thickness of the plastic substrates and the glass substrate are selected such that the stacked optical waveguide is lightweight, but also has sufficient drop performance. The stacked optical waveguide can be efficiently manufactured as the adhesive bonds a plastic substrate to a glass substrate.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Referring to FIG. 1, a stacked optical waveguide 10 may use two glass substrates 12 and 14 with a single cover substrate 16. The stacked optical waveguide 10 is suitable as an image display, such as a see-through display for eyewear including smart glasses and headgear. Each of the optically transparent glass substrates 12 and 14, and cover 16 are spaced from each other by an adhesive 18 at their edges to create air gaps 20 and 22 to achieve the necessary optical stack-up, and encapsulate optical nano-structure gratings 24 for reliability purposes. Plastic substrates are desirable from a product weight and drop performance perspective. However, mimicking the glass substrate waveguide stack 10 exactly with plastic substrates introduces lamination challenges between two plastic substrates, i.e. laminating two "soft" substrates together, with an air gap while maintaining a constant gap between them.

Figure 2:
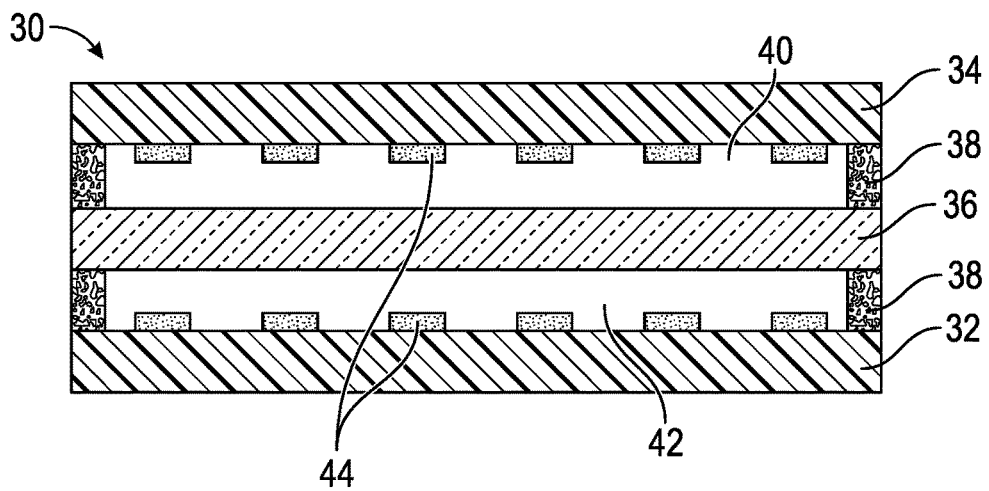
FIG. 2 illustrates a stacked optical waveguide having two plastic substrates each secured to one glass substrate sandwiched between the plastic substrates.

Referring to FIG. 2, this disclosure provides an improved stacked optical waveguide 30 to achieve a waveguide stack using two plastic substrates 32 and 34 and a single "hard" glass cover 36 thereby providing benefits on product weight and reliability. The plastic substrates 32 and 34 are each lighter in weight than the glass substrate 36 to provide a lighter stacked optical waveguide 30. Each of the plastic substrates 32 and 34 are adhered to opposite sides of the glass cover 36 sandwiched between them by adhesive 38 at their edges with air gaps 40 and 42 formed between them, as shown. Each of the plastic substrates 32 and 34 are optically transparent and have respective optical nano-structure gratings 44 facing the glass cover 36 and each other. This removes the challenges of adhering two soft plastic substrates 32 and 34 to each other, which poses challenges in terms of maintaining a constant air gap between them needed for acceptable waveguide performance having an acceptable modulation transfer function (MTF). The soft plastic substrates 32 and 34 are each secured to the hard glass substrate 36 on either side which can be supported in manufacturing. This design provides a "constant thickness" glass substrate 36 as the physical spacer and backbone between the two plastic substrates dominating the spacing, as opposed to stacking the two soft substrates 32 and 34 against each other which are subject to "flop" which may result in a changing gap between the layers.

In addition, this disclosure allows the glass substrate 36 to be decoupled from the waveguide functionality itself, as the glass substrate 36 does not include the optical nano-structure gratings 24. This allows using conventional chemically strengthened glass for glass substrate 36 (Gorilla® glass as an example). This in turn enables using thinner glass for glass substrate 36, helping reduce product weight while maintaining product drop performance via use of the chemically strengthened glass.

The chemically strengthened glass substrate 36 further helps product performance from a drop perspective, which is a distance a device can be dropped and functionally survive the impact of the fall, as typical waveguide glass substrates are not chemically strengthened which poses a risk from a product drop perspective. Also, having each of the waveguide structures 32 and 34 facing the glass substrate 36 and sealed by adhesive 38 enables excellent reliability performance as well, as the nano-structure gratings 44 are encapsulated in this stack and not exposed to the environment.

In one example, the thickness of the glass substrate 36 may be between 300 and 1000 microns, and each of plastic substrates may have a thickness between 50-1000 microns. The thickness of the adhesive 38 may have a thickness between 50-100 microns and thus the spacing of the air gaps 40 and 42 may between 50-100 microns. However, limitation to these thicknesses is not to be inferred. These dimensions are established to provide good drop performance while limiting the weight of the stacked optical waveguide 30.

Figure 3:
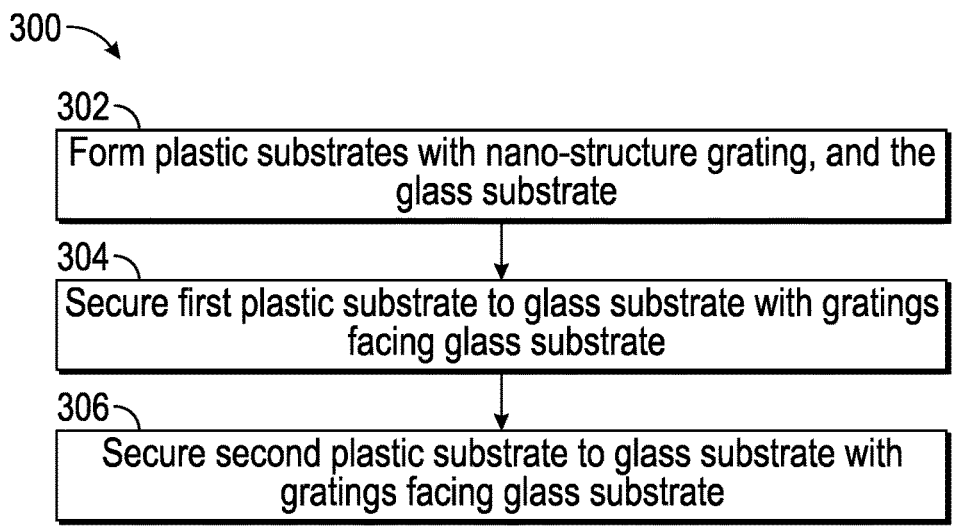
FIG. 3 illustrates a flow diagram of a method of making the stacked optical waveguide.

Referring to FIG. 3, there is shown a flowchart of a method 300 of forming the stacked optical waveguide 30.

At block 302, the respective plastic substrates 32 and 34 are formed using conventional processing techniques. The respective nano-structure gratings 44 provide waveguides for light to pass therethrough and form an image display. The glass substrate 36 is also formed, and may be chemically strengthened glass, which further helps product performance from a drop perspective.

At block 304, the plastic substrate 32 is secured to the glass substrate 36 with adhesive 38 at the edges of the substrates. The plastic substrate 32 is oriented such that the respective nano-structure gratings 44 face the glass substrate 36. The adhesive establishes a thickness of the respective gap 42.

At block 306, the plastic substrate 34 is secured to the glass substrate 36 with adhesive 38 at the edges of the substrates. The plastic substrate 34 is also oriented such that the respective nano-structure gratings 44 face the glass substrate 36. The adhesive establishes a thickness of the respective gap 40.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A stacked optical waveguide, comprising:
    a glass substrate;
    a plastic substrate having an optical structure, the plastic substrate secured to and spaced from the glass substrate;
    another plastic substrate having another optical structure, the other plastic substrate secured to and spaced from the glass substrate such that the glass substrate is interposed between the plastic substrates;
    an air gap disposed between the plastic substrate and the glass substrate; and
    another air gap disposed between the other plastic substrate and the glass substrate, wherein the optical structures are encompassed by the respective air gap, and wherein the optical structures face the glass substrate.

2. The waveguide of claim 1, wherein the optical structures comprise optical gratings.

3. The waveguide of claim 2, wherein the optical structures comprise nano sized gratings.

4. The waveguide of claim 1, wherein the plastic substrates are each secured to the glass substrate using an adhesive.

5. The waveguide of claim 4, wherein the adhesive seals the optical structures within the respective air gap from an environment.

6. The waveguide of claim 1, wherein the plastic substrates and the glass substrate are each optically transparent.

7. The waveguide of claim 1, wherein the plastic substrates are softer than the glass substrate.

8. The waveguide of claim 1, wherein the plastic substrates are each lighter than the glass substrate.

9. The waveguide of claim 1, wherein the glass substrate is chemically hardened.

10. The waveguide of claim 9, wherein the glass substrate has a thickness of between 50 and 100 microns.

11. A method of processing a stacked optical waveguide, comprising:
   securing a plastic substrate to a glass substrate, the plastic substrate having an optical structure, the plastic substrate spaced from the glass substrate; and
   securing another plastic substrate to the glass substrate, the other plastic substrate having another optical structure, the other substrate spaced from the glass substrate such that the glass substrate is interposed between the plastic substrates, wherein an air gap is disposed between the plastic substrate and the glass substrate, another air gap is disposed between the other plastic substrate and the glass substrate, wherein the optical structures are encompassed by the respective air gap, and wherein the structures face one another.

12. The method of claim 11, wherein the optical structures comprise optical gratings.

13. The method of claim 12, wherein the optical structures comprise nano sized gratings.

14. The method of claim 11, wherein the securing comprises securing the plastic substrates to the glass substrate using an adhesive.

15. The method of claim 14, wherein the adhesive seals the optical structures within the respective air gap from an environment.

16. The method of claim 11, wherein the plastic substrates and the glass substrate are each optically transparent.

17. The method of claim 11, wherein the plastic substrates are softer than the glass substrate.

18. The method of claim 11, wherein the plastic substrates are each lighter than the glass substrate.

19. The method of claim 11, wherein the glass substrate is chemically hardened.

20. The method of claim 19, wherein the glass substrate has a thickness of between 50 and 100 microns.

* * * * *